(12) United States Patent
    Masterson

(10) Patent No.: US 8,698,838 B1
(45) Date of Patent: Apr. 15, 2014

(54) ARCHITECTURE FOR MULTIPLE GRAPHICS PLANES

(75) Inventor: Anthony D. Masterson, Saratoga, CA (US)

(73) Assignee: Zenverge, Inc., Santa Clara, CA (US)

( * ) Notice: Subject to any disclaimer, the term of this patent is extended or adjusted under 35 U.S.C. 154(b) by 1478 days.

(21) Appl. No.: 11/851,912

(22) Filed: Sep. 7, 2007

(51) Int. Cl.
    *G09G 5/00* (2006.01)
    *G09G 5/14* (2006.01)
    *G06T 1/20* (2006.01)
    *G06T 11/00* (2006.01)
    *G06T 11/60* (2006.01)
    *G06T 19/00* (2011.01)

(52) U.S. Cl.
    CPC .. *G09G 5/14* (2013.01); *G06T 1/20* (2013.01); *G06T 11/00* (2013.01); *G06T 11/60* (2013.01); *G06T 19/00* (2013.01)
    USPC ........... 345/629; 345/502; 345/503; 345/504; 345/505; 345/506; 345/519; 345/520; 345/522

(58) Field of Classification Search
    CPC .......... G09G 5/14; G06T 11/00; G06T 11/60; G06T 19/00; G06T 1/20
    USPC .................................. 345/629, 505, 581–584
    See application file for complete search history.

(56) References Cited

U.S. PATENT DOCUMENTS

| | | | |
|---|---|---|---|
| 6,297,852 B1 * | 10/2001 | Laksono et al. | 348/584 |
| 6,462,744 B1 * | 10/2002 | Mochida et al. | 345/543 |
| 6,658,057 B1 * | 12/2003 | Chen et al. | 375/240 |
| 6,683,992 B2 * | 1/2004 | Takahashi et al. | 382/243 |
| 6,753,865 B1 * | 6/2004 | Conklin | 345/475 |
| 6,952,211 B1 * | 10/2005 | Cote et al. | 345/473 |
| 6,977,664 B1 * | 12/2005 | Jinzenji et al. | 345/629 |
| 7,839,927 B2 * | 11/2010 | Quinard et al. | 375/240.01 |
| 8,111,746 B2 * | 2/2012 | Quinard et al. | 375/240.01 |
| 2003/0189571 A1 * | 10/2003 | MacInnis et al. | 345/505 |
| 2005/0012759 A1 * | 1/2005 | Valmiki et al. | 345/629 |
| 2005/0088446 A1 * | 4/2005 | Herrick et al. | 345/531 |
| 2006/0253779 A1 * | 11/2006 | Quinard et al. | 715/719 |
| 2006/0268012 A1 * | 11/2006 | MacInnis et al. | 345/629 |
| 2011/0038409 A1 * | 2/2011 | Quinard et al. | 375/240.2 |

* cited by examiner

*Primary Examiner* — Jin-Cheng Wang
(74) *Attorney, Agent, or Firm* — Fenwick & West LLP

(57) ABSTRACT

Systems and methods for layering multiple graphics planes on top of a compressed video signal are disclosed herein. A processed video stream is received from a video processing path, wherein the processed video stream comprises a stream of video macroblocks. A composite graphics plane is received from a graphics processing path, wherein the composite graphics plane comprises a set of graphics macroblocks. The composite graphics plane comprises a plurality of layered graphics planes. The composite graphics plane is layered on top of the processed video stream to generate an output video stream. Layering comprises blending a video macroblock from the stream of video macroblocks with a graphics macroblock from the set of graphics macroblocks. By layering one macroblock at time, graphics overlay can occur in real time or faster than real time as the compressed input stream is received.

25 Claims, 7 Drawing Sheets

FIG. 3

YUV 4:2:0

YUV 4:4:4

2x2 Cell
300

ARCHITECTURE FOR MULTIPLE GRAPHICS PLANES

FIELD OF THE ART

The subject matter disclosed generally relates to media processing, and more specifically, to layering multiple graphics planes on top of a compressed video stream.

BACKGROUND

Conventionally, multimedia such as video and audio has been delivered using analog delivery mediums such as NTSC (National Television System Committee) signals, and has been stored using analog storage mediums such as video cassette recorders. Thus, a significant part of the electronic components in a display device are dedicated to analog receiving hardware. If the display device has a digital output, additional electronic components are needed to convert the analog signal to a digital signal. With the advent of digital delivery mediums, such as ATSC (Advanced Television Systems Committee) signals, and of digital storage mediums such as DVDs, multimedia can be delivered and stored using pure digital signals. These digital signals typically contain compressed frames of video.

Digital media technology enables a greater variety of features to be delivered to users to enhance their multimedia experience. One particularly useful feature in conventional media systems involves layering graphics planes on top of an uncompressed video signal. A graphics overlay system may, for example layer still images, text, or animations on top of an input media stream. Applications of graphic overlay include various On-Screen Display (OSD) features such as navigation menus, setup screens, alerts, program information, digital watermarks, or other graphics layered on top of an uncompressed video signal without interrupting the media stream.

However, conventional graphics overlay systems are not well adapted for use with compressed digital media. In a conventional graphics overlay system, a series of blend operations is performed on stored uncompressed video frames with each successive blend operation layering an additional graphics plane. Conventionally, the blend operation uses a scan-line process by traversing and blending the video and graphics planes one line at a time. A conventional scan-line graphics overlay system is well adapted for use with conventional analog or uncompressed media in which video is sent to a display one line at a time. However, the conventional system is poorly suited for use with compressed digital media that do not follow a scan-line process but instead operate on a macroblock basis.

FIG. 1 illustrates a conventional graphic overlay system. Video input 104 comprises a compressed video stream. An input is coupled to a decoder 108 and receives the compressed video input 104. The decoder 108 is configured to decode the input video stream. Each frame of the video input 104 is fully decoded and stored in video memory 112 before the blend operations occur. Graphics planes 124 comprise a number of graphics layers (e.g. layers 132a-c) to be layered on video input 104. Graphics planes 124 may be stored in a graphics memory 128. Graphics memory 128 and video memory 112 are coupled to a series of blenders 116a-116c. Blenders 116a-c blend each layer 132a-c with the video stream in successive blend operations. Thus, conventionally, an additional blender 116 is used for each additional graphics plane to be layered on top of the video input 104. After the signal passes through all the blenders 116, a video output 120 is produced.

Conventional graphics overlay systems are inefficient for overlaying graphics on compressed digital video. With a conventional graphics overlay system, the full frame of the video input 104 must first be fully decoded and stored in a memory 112 before any blend operations take place. Traditional decoders must first store the video pixels so that they can be reordered from the macroblock order used in transmitting and processing compressed video into the raster scan order used for display. This means the conventional graphics overlay process cannot operate on streaming compressed video. Further, significant memory is needed to store the fully decoded frames. Additionally, conventional graphics overlay devices require separate blender hardware 116 for each layer 132 of graphics to be layered on the video input 104. This results in significant increases in cost and physical size as the number of graphics planes increases.

Conventional graphics overlay systems are further inefficient for providing output to multiple playback devices. For example, conventional systems are unable to send multiple compressed video streams to multiple playback devices with a different graphic image or OSD overlayed onto each stream. Instead, each playback device would require its own dedicated graphics overlay processor, each of which can be significantly costly.

Therefore, the present state of the art lack a system for layering multiple graphics planes on a compressed video stream that offers better performance and provides more efficient use of hardware than conventional devices. Furthermore, the present state of the art lacks a graphics overlay system that can efficiently provide output to multiple users each having a different playback device.

SUMMARY

An improved system and method for layering multiple graphics planes on top of a compressed video signal is described herein. A processed video stream is received from a video processing path. In one embodiment, the video processing path processes a compressed input stream in a first compressed format according to various operations such as decoding, scaling and color space conversion. The processed video stream comprises a stream of video macroblocks.

In a separate graphics processing path, graphics are processed according to various processing operations and multiple graphics planes are layered to form a composite graphics plane comprising a set of graphics macroblocks. In a blender, the composite graphics plane is layered on top of the processed video stream to produce a video output stream with graphics overlay. In one embodiment, the video output stream is further processed and encoded to produce a compressed output stream in a second compressed format.

In one embodiment, video and graphics are processed one macroblock at a time as the macroblocks are received. In contrast to conventional system, processing may occur in real-time or faster than real-time without storing fully decoded frames of video.

The features and advantages described in the specification are not all inclusive and, in particular, many additional features and advantages will be apparent to one of ordinary skill in the art in view of the drawings, specifications, and claims. Moreover, it should be noted that the language used in the specification has been principally selected for readability and instructional purposes and may not have been selected to delineate or circumscribe the inventive matter.

BRIEF DESCRIPTION OF THE DRAWINGS

The teachings herein can be readily understood by considering the following detailed description in conjunction with the accompanying drawings.

FIG. 3 illustrates one embodiment of a YUV 4:4:4 and YUV 4:2:0 color space encoding.

DETAILED DESCRIPTION

Systems and methods for a graphics overlay architecture are described herein. Preferred embodiments will now be described with reference to the figures (FIGS.) where like reference numbers indicate identical or functionally similar elements.

Figure 1:
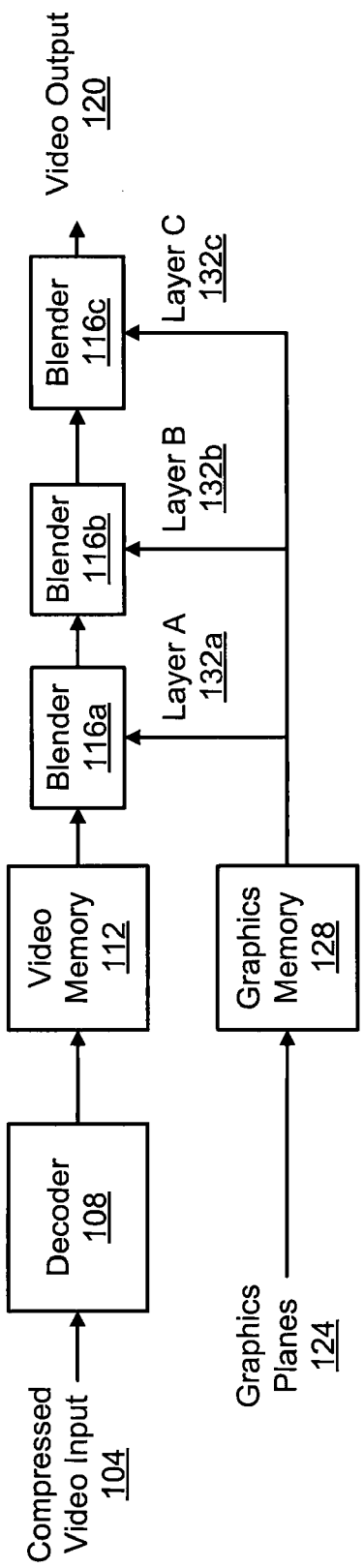
FIG. 1 illustrates a conventional graphics overlay architecture.

Referring back to FIG. 1, a block diagram of a conventional graphics overlay architecture is illustrated. As described previously, the conventional graphics overlay architecture of FIG. 1 requires a separate blender 116 for each graphics layer 132 and requires the video input 104 to be fully decoded and stored in the video memory 112 before blending.

Compressed Video with Graphics Overlay

Figure 2:
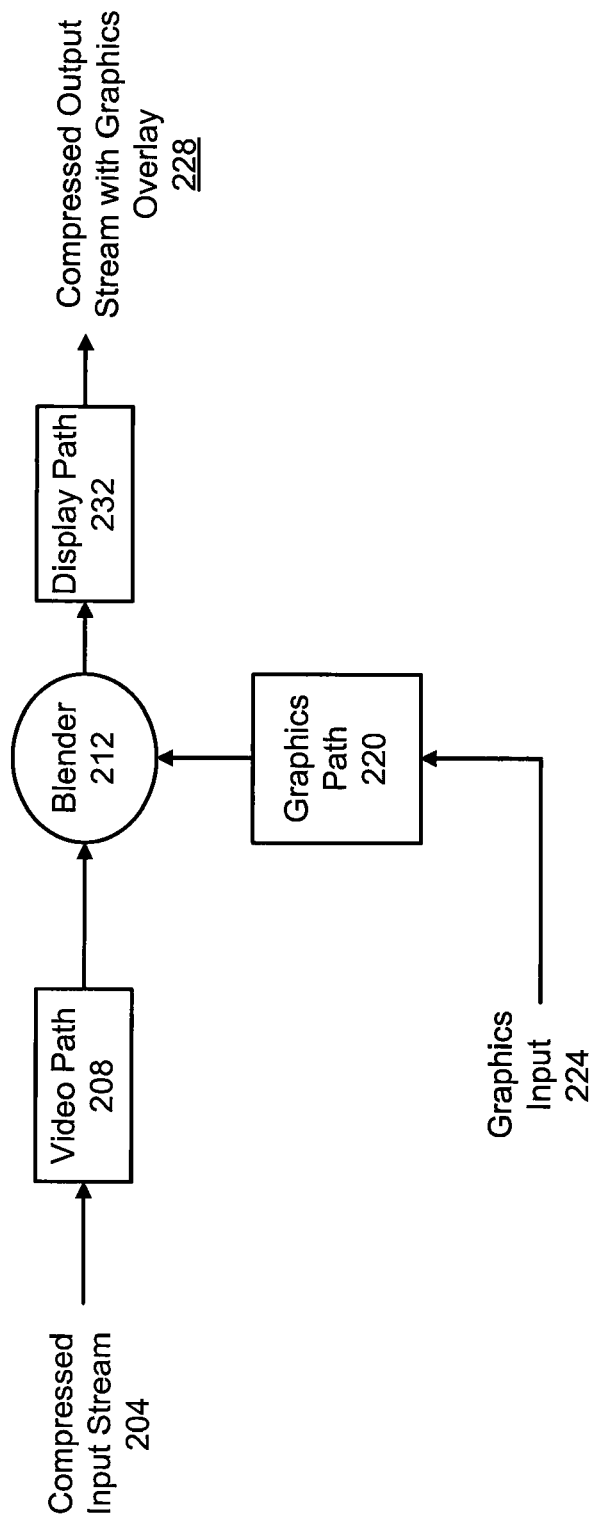
FIG. 2 illustrates one embodiment of an architecture for layering multiple graphics planes on top of compressed video.

Now, referring to FIG. 2, a block diagram illustrates one embodiment of a graphics overlay architecture. For the purposes of illustration, the graphics overlay architecture is described in terms of a system. It is noted that in various embodiments, a graphics overlay architecture can be implemented as hardware, software, an integrated circuit, and so on. Other methods for electronically implementing computational steps will be apparent to one of skill in the art without departing from the scope of the disclosed embodiments.

In one embodiment, the system is adapted to layer multiple graphic planes on top of a compressed input stream 204 to produce a compressed output stream with graphics overlay 228. The compressed input stream 204 and output stream 228 can be encoded under various audio/video protocols such as, MPEG-2, MPEG-4, MP3, H.263, H.264, AVS, a RealVideo format, a Windows Media Player format such as VC-1, other video formats, other audio formats, and the like. The formats can vary in characteristics such as bit rate and resolution. As will be apparent to one of skill in the art, media formats discussed herein are intended to be exemplary, and other forms of compressed media and/or data may be used without departing from the scope of the disclosed embodiments.

In one embodiment, the compressed input 204 and output 228 streams are composed of a sequence of video frames where each video frame comprises an image. As will be apparent to one of ordinary skill in the art, the systems and methods described may also be applied to image or video fields instead of frames. A video field typically comprises every other line of the full video frame (e.g. a field may comprise only the odd lines or only the even lines of a video frame). Video fields are used, for example, in an interlaced system in which the system first processes the odd field and then the even field of the video frame, or vice versa. Thus, although various embodiments are described within in terms of video or image frames, the techniques may also be applied to video or image fields without departing from the scope of the disclosed embodiments.

In one embodiment, the compressed video input stream 204 comprises a stream of macroblocks where each macroblock is a subset of pixels from a video frame. For example, in one embodiment, a macroblock comprises a 16×16 grid of pixels. The compressed input stream 204 is coupled to a video path 208 that processes the incoming compressed input stream 204 according to various operations. In one embodiment, the video path 208 comprises a pipeline processing path such that processing of a macroblock is performed by a series of processing elements. Thus, different macroblocks in the compressed input stream 204 may be concurrently processed at the various processing stages in the pipeline. In one embodiment, macroblocks are processed and outputted by the video path 208 in real-time or faster than real-time as they are received.

For the purposes of this description, a real-time system receives, processes, and outputs the media stream fast enough that there is no noticeable delays or interruptions in the outputted media stream. For example, if a video stream is received at 30 frames/second, the real-time system will process the video at least as fast as 30 frames/second so there is no delay or interruption in the output. Further, a faster than real-time system is possible if the system receives and processes the media stream faster than its intended output rate. For example, if a user wishes to process and store a media stream to be viewed at a later time, the system can receive and process the media stream in a time shorter than the length of the media stream by processing faster than the intended output rate. Further, in one embodiment the real-time or faster than real-time system immediately processes and outputs each macroblock as it is received. Thus, the video path 208 does not require storage of fully uncompressed video frames.

A graphics input 224 is processed by a graphics path 220 according to a variety of processing operations. The graphics input 224 comprises the graphics planes to be layered on the compressed input stream 204. For example, the graphics input 224 may include, without limitation, text, still images, or animations for setup menus, alerts, program information, watermarks, or other useful displays. Each plane of the graphics input 224 may be a different type of graphic (e.g., text, still images, or animation) and each graphics plane may comprise different information. In one embodiment, the graphics path 220 comprises a pipeline processing path such that processing is executed by a series of processing elements. Further, graphics planes may be processed one macroblock at a time as they enter the graphics path 220. In one embodiment, the graphics path 220 includes a blender and a feedback loop such that multiple graphics planes are pre-blended within the graphics path 220 before being layered on top of the video signal.

The processed outputs of the video path 208 and the graphics path 220 are coupled to the blender 212. The blender 212 mixes the processed graphics planes and processed video and outputs a blended video signal having the layered video and graphics to a display path 232. In one embodiment, the blender 212 combines the video and graphics together on a pixel by pixel basis by multiplying the video signal by a value, $\alpha$, ranging from 0 to 1, multiplying the graphics signal by the value of $(1-\alpha)$, and adding the results of the multiplies together. Here, the value for $\alpha$ controls the ratio between the video and the graphics in the blended result. Typically, for accurate blending, the color space and sampling of the graphics and video are the same.

In one embodiment, the blender 212 mixes a block of pixels from the processed graphics planes with a block of pixels from the video (e.g., a macroblock as received from the decoder). By blending on a block basis, the blender 212 can operate on blocks of pixels in the same order that they are received in the compressed input stream 204. This allows the system to process the graphics overlay in real-time or faster than real-time without needing to store fully decoded frames. This is in contrast to conventional systems that instead blend in horizontal line order and must store the pixels into a memory so that they can be reordered from macroblock order into raster scan order before blending.

The display path 232 performs additional post-blending processing operations on the video signal with graphics overlay. For example, in one embodiment, the display path 232 encodes the signal to produce a compressed output stream with graphics overlay 228. The display path 232 may further include a downsampler for downsampling the compressed output stream. The compressed output stream with graphics overlay 228 can be, for example, stored to a compressed storage device or outputted to a playback device with a viewing screen.

Color Space Encoding

Figure 3:
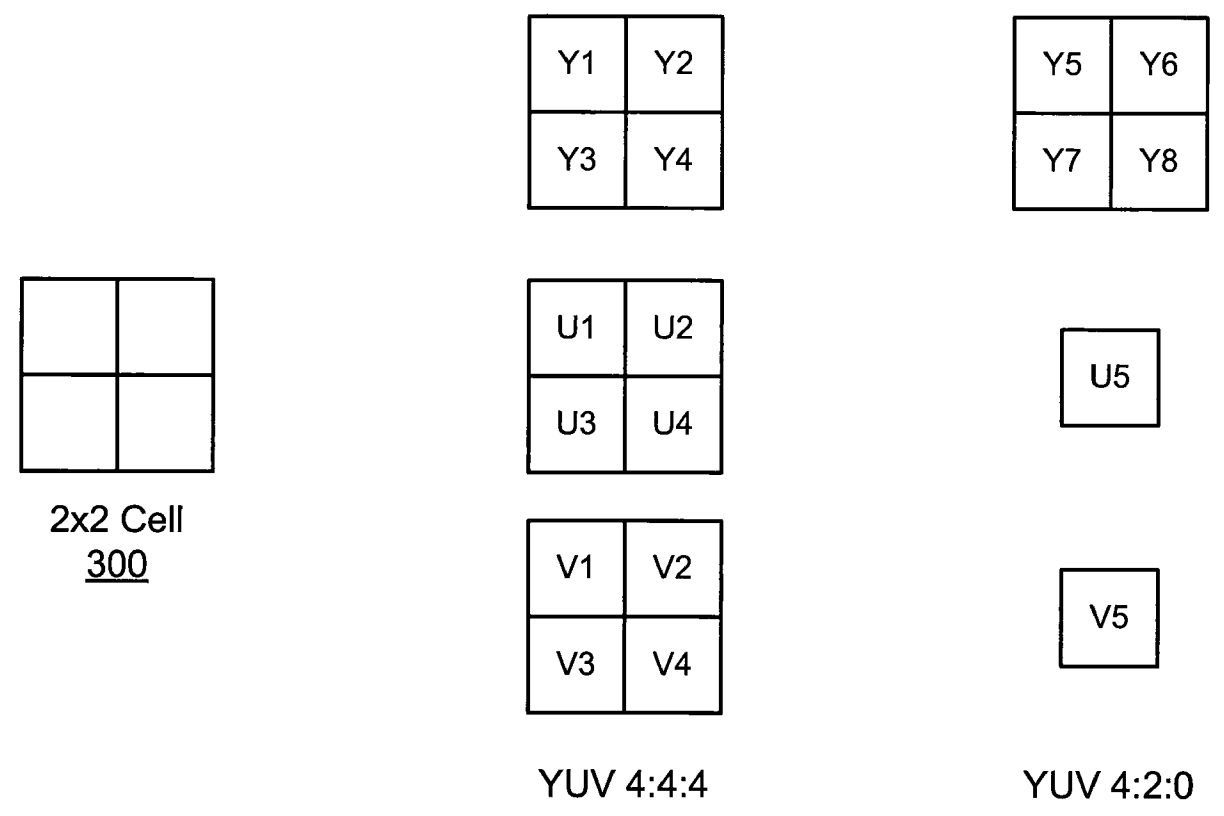

In one embodiment, each macroblock is represented using color space encoding. In a YUV color space, pixels are described in terms of one luminance component (Y) and two chrominance components (U, V). The luminance component, Y, represents the brightness while the U and V component represent the color on a U-V color plane. There are several common variations of YUV encoding. FIG. 3 illustrates example embodiments of YUV 4:4:4 and YUV 4:2:0 formats. In one embodiment, macroblocks are further sub-divided into cells 300. For example, in one embodiment, a cell 300 comprises a set of pixels arranged in a 2×2 grid. In YUV 4:4:4 format, each cell is represented by 4 luminance values, Y1-Y4, and 4 pairs of chrominance values, U1-U4 and V1-V4. In YUV 4:2:0 format, a cell having a 2×2 grid of pixels is represented by 4 luminance values, Y5-Y8 but only a single U/V pair, U5 and V5. Thus, in YUV 4:2:0 format, the U/V values are downsampled relative to YUV 4:4:4 format. Techniques for downsampling are described in further detail below.

It is noted that other color space encodings are also possible. For example, in one embodiment a Red-Green-Blue (RGB) color space representation is used. In the RGB color space, pixels are represented by the weights of their red, green, and blue components. As will be apparent to one of skill in the art, color space encodings discussed herein are intended to be exemplary, and other color space encodings may also be used without departing from the scope of the disclosed embodiments. Further, data may be converted between color spaces at various stages in processing.

An example of conversion between color space formats is described below with respect to converting between YUV 4:4:4 and YUV 4:2:0 formats. It will be apparent to one of skill in the art that the described techniques also can be applied to conversion between other color space formats. In one embodiment, a video stream is converted from a first color space format (e.g., YUV 4:4:4) format to a second color space format (e.g., YUV 4:2:0 format) by averaging the chrominance values in each cell having a 2×2 grid of pixels. For example, referring to FIG. 3, U5 is computed by averaging U1-U4 and V5 is computed by averaging V1-V4. In another embodiment, the chrominance values, U1-U4 and V1-V4 are passed through a different downsampling filter (e.g., a weighted averaging filter) to produce U5 and V5. In yet another embodiment, a wider filter can also be used for chroma downsampling where U and V values from several 2×2 groups of pixels are filtered using an appropriate lowpass filter and then decimated.

In yet another embodiment, values for U5 and V5 are determined based at least in part on the luminance values, Y1-Y4. For example, in one embodiment, the luminance values Y1-Y4 are compared to each other to determine the brightest pixel (e.g., highest Y value). The chrominance values of the brightest pixel in the YUV 4:4:4 encoding are then used as the chrominance values U5 and V5 in the 4:2:0 encoding. For example, if Y2 is determined to have the highest luminance value in the cell, U5 will be set to the value of U2 and V5 will be set to the value of V2. In yet another embodiment, the values for U5 and V5 are selected based on the chrominance values of the brightest pixel only if the brightest pixel has a luminance value that is a threshold greater than the luminance value of the other pixels. The threshold may be a predetermined value that is selected and stored in memory. If the brightest pixel, is less than a threshold greater than the luminance value of the other pixels, U5 and V5 may be determined by passing U1-U4 and V1-V4 through a downsampling filter (such as, for example, an averaging filter).

In yet another embodiment, chrominance values U1-U4 and V1-V4 are weighted by their corresponding Y values, Y1-Y4, and then passed through a downsampling filter (e.g., an averaging filter) to determine U5 and V5. For example, in one embodiment, U5 and V5 can be calculated from Eq. 1 and Eq. 2 respectively as follows:

$$U5 = \frac{Y1}{Y_{SUM}}U1 + \frac{Y2}{Y_{SUM}}U2 + \frac{Y3}{Y_{SUM}}U3 + \frac{Y4}{Y_{SUM}}U4 \qquad (1)$$

$$V5 = \frac{Y1}{Y_{SUM}}V1 + \frac{Y2}{Y_{SUM}}V2 + \frac{Y3}{Y_{SUM}}V3 + \frac{Y4}{Y_{SUM}}V4 \qquad (2)$$

where $Y_{SUM}$ is given by Eq. 3 as follows:

$$Y_{SUM} = Y1 + Y2 + Y3 + Y4 \qquad (3)$$

One advantage of the disclosed techniques of basing the YUV 4:2:0 chrominance values U5 and V5 at least in part on the YUV 4:4:4 luminance values Y1-Y4 is prevention of a high intensity pixel from being tinted by the chroma component of a neighboring low-intensity pixel. This is particularly beneficial in a graphics overlay system because high intensity pixels may be overlayed next to neighboring low intensity pixels on a different layer. Thus, the techniques improve the quality of the resulting output stream relative to conventional systems.

Video Processing Path

Figure 4:
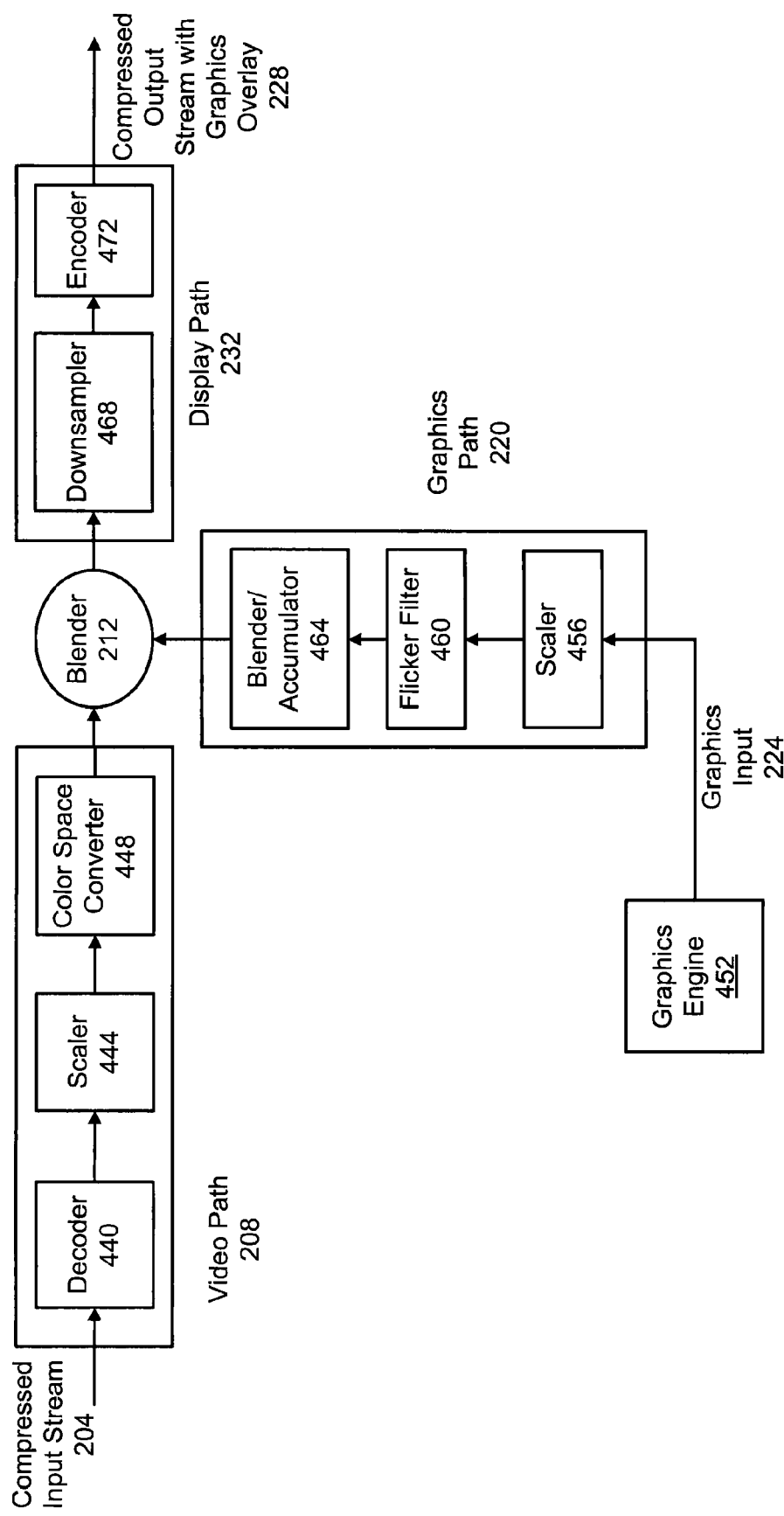
FIG. 4 illustrates an example embodiment of an architecture for layering multiple graphics planes.

FIG. 4 illustrates an example embodiment of a graphics overlay system for processing compressed video and graphics. In one embodiment, the video path 208 comprises a decoder 440, a scaler 444, and a color space converter 448. The decoder 440 receives a compressed input stream 204 from a compressed input source and outputs decoded frames. In one embodiment, the decoder 440 processes and outputs one macroblock at a time as the macroblocks are received from the compressed input stream 204. In one embodiment, the decoder 440 decodes the compressed input stream 204 in real-time or faster than real-time.

The decoder 440 is coupled to a scaler 444 to optionally scale the decoded video signal. In one embodiment, the scaler 444 processes and outputs the decoded video signal one macroblock at a time as each macroblock is received from the decoder 440. Thus, the decoded frames do not need to be stored to a memory before processing. Scaling may include, for example, converting between video resolutions by either upscaling or downscaling the resolution. For example, the compressed input stream may be in a High Definition (HD) format, and need to be downscaled to a Standard Definition (SD) format in order to match the resolution of a display. In one embodiment, the scaler 444 automatically determines the scaled resolution based on the resolution of a display coupled to the system.

The scaler 444 is coupled to a color space converter 448 for converting between color spaces and adjusting gamma, hue, saturation, brightness and contrast, as desired. In one embodiment, color space converter 448 converts between YUV and RGB formats. In another embodiment, the color space converter 448 converts between various YUV formats such as YUV 4:4:4 and YUV 4:2:0. For example, the color space converter 448 may accept a video input in YUV 4:2:0 format and output video in YUV 4:4:4 format. In order to convert from YUV 4:2:0 to YUV 4:4:4, the chroma values (U,V) may be replicated or filtered for each pixel in a cell.

In yet another embodiment, the color space converter 448 converts between color spaces for standard definition (SD) format video (for example, typically CCIR601 or ITU Rec. 601-1) and high definition (HD) format (for example, typically CCIR709 or ITU Rec. 709). Here, the color space converter 448 performs various conversions due to the different standards employed by these formats. In yet further alternative embodiments, the color space converter 448 converts between other color space formats as needed.

In one embodiment, color space conversion is performed by multiplying the signal values (e.g. YUV values) by a predetermined coefficient matrix. A different color space conversion matrix may be used depending on the desired type of conversion. For example, a first predetermined matrix may be selected to convert from RGB to YUV 4:4:4, a second predetermined matrix may be selected to convert from CCIR601 to CCIR709, and so on. The predetermined coefficient matrices may be stored in a coefficient register or other memory.

The color space converter 448 may further provide various other operations by multiplying the signal values by various other predetermined matrices. For example, additional coefficient matrices may be used for hue adjustment, saturation adjustment, contrast adjustment, brightness adjustment or other adjustments or conversions. In one embodiment, all the coefficient matrices are pre-multiplied such that only one matrix multiply operation occurs during real-time processing. For example, a conversion matrix, hue matrix, saturation matrix, and contrast matrix may be pre-multiplied to form an overall matrix that is stored in a register. During real-time (or faster than real-time) processing, the video signal is only multiplied by the overall matrix to perform the desired adjustments and conversions.

In one embodiment, the color space converter 448 further performs other operations on the video signal. For example, the color space converter 448 may process Y values to remove Y pedestal and perform gamma correction. A Y pedestal is optionally used to place the black level of video at a level that is 7.5% higher than the top of video sync. Additionally, the color space converter 448 may adjust brightness by adding a programmable offset to the Y value. In one embodiment, the adjusted Y, U, and V values are each clamped after color space conversion and adjustment in order to prevent overflow or underflow. This is useful in preventing errors in operations performed by blender 212.

In one embodiment, the color space converter 448 processes and outputs the video signal one macroblock at a time as it is received. This allows color space conversion to occur in real-time (or faster than real-time) without the need to store uncompressed video frames. It should be noted that various scaling and color space conversion operations may be processed in any order. For example, in one embodiment, color space conversion occurs before scaling.

Graphics Processing Path

The graphics path 220 processes the on screen display (or OSD) graphics to be layered on top of the video signal by the blender 212. In one embodiment, the graphics path 220 comprises a scaler 456, a flicker filter 460, and a blender/accumulator 464. It should be noted that the graphics path 220 of FIG. 4 is merely an illustrative example embodiment and that graphics processing operations may occur in any order. The graphics path 220 receives a graphics input 224 comprising graphics planes to be layered on top of the video stream. In one embodiment, the graphics input 224 is rendered and outputted by a graphics engine 452. In an alternative embodiment, the graphics input 224 is received from a memory or network. The graphics engine 452 also may perform various color space conversion operations as described above. For example, the graphics engine 452 may convert the graphics to an appropriate color space format to match the video signal and adjust hue, saturation, contrast, brightness, gamma, pedestal, or other adjustments or conversions. In one embodiment, graphics are outputted by the graphics engine 452 one macroblock at a time.

In one embodiment, the graphics output passes through the scaler 456. The scaler 456 may perform various scaling operations on graphics to match the graphics resolution to the resolution of the video signal or a display. The flicker filter 460 filters graphics planes on a macroblock basis. Flicker filtering allows high resolution graphics to be displayed on an interlaced display (such as a CRT) without flickering. The flicker can be caused by single pixel high horizontal lines that only get displayed 30 times a second on an interlaced display and therefore flash on and off, creating a distraction to the viewer.

The blender/accumulator 464 performs pre-blending of multiple graphics planes. Any number of graphics planes may be blended together. In contrast to traditional scan-line blenders, each graphics plane is blended and accumulated one macroblock at a time as it is received. Pre-blending multiple graphics planes before blending with the video signal simplifies the final blend operation so that it can occur in real-time or faster than real-time.

Display Path

Blending of the video signal and graphics planes occurs in blender 212 as previously described. The blender 212 is coupled to the display path 232 to perform various post-blending processing operations. In one embodiment, the display path 232 comprises a downsampler 468. The downsampler 468 may, for example, downsample the blender output in YUV 4:4:4 format to YUV 4:2:0 format, as previously described. In alternate embodiments, the downsampler 468 may compress the video signal using a different color space format.

In one embodiment, the downsampler 468 is coupled to an encoder 472. The encoder 472 optionally encodes the video signal with graphics overlay to a compressed format. In one embodiment, the encoder 420 encodes the video signal one macroblock at a time as the macroblocks are received. In an alternative embodiment, the encoder 420 is bypassed and the video signal sent directly to a display. In yet another embodiment, video signal with graphics overlay is coupled to a memory for storage or to a network.

System for Providing On Screen Display (OSD) to Multiple Screens

Figure 5:
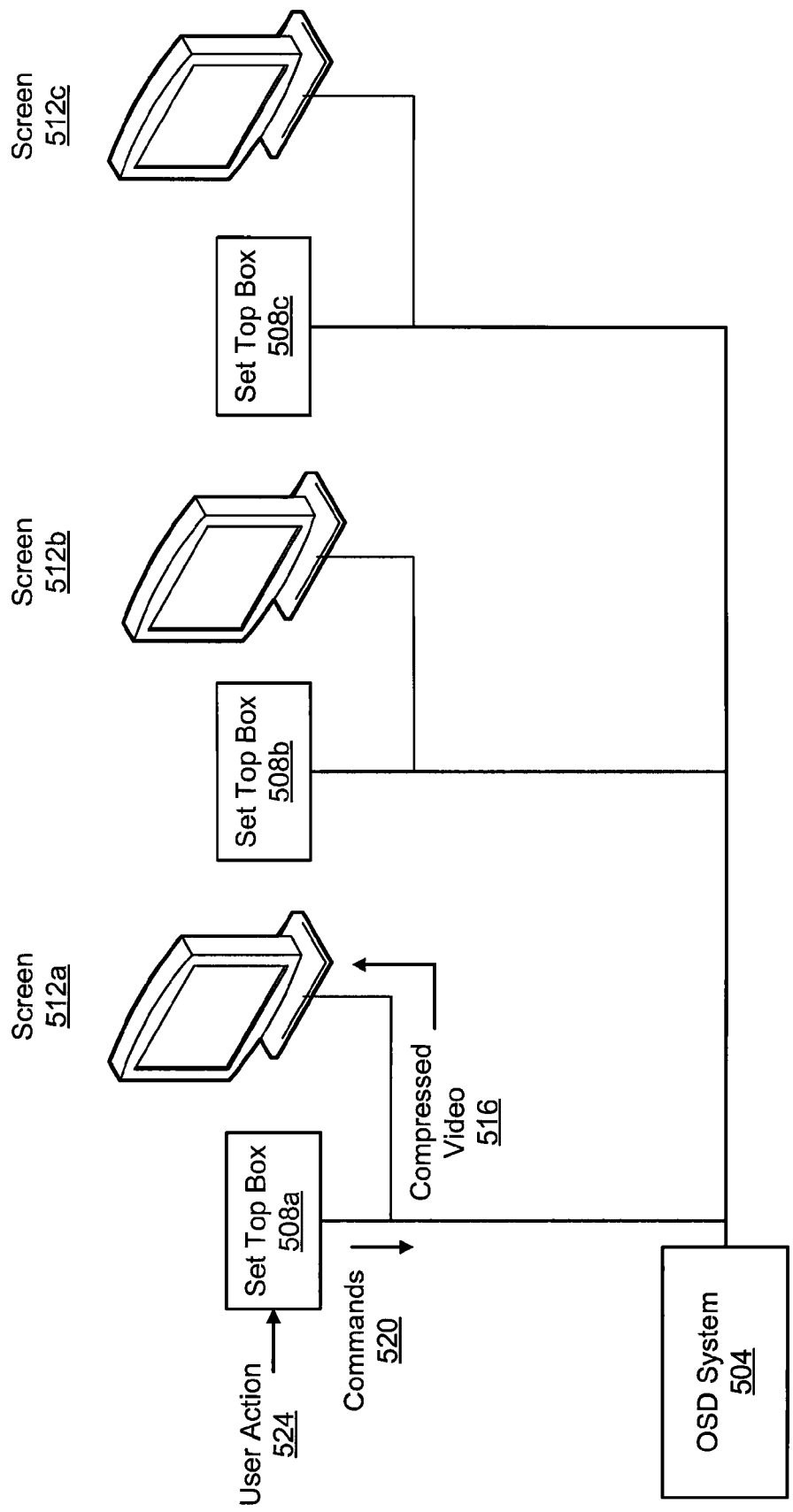
FIG. 5 illustrates one embodiment of a system for providing compressed video with graphics overlay to multiple displays.

FIG. 5 illustrates a system for providing On Screen Display (OSD) to multiple screens using a graphics overlay system. An OSD system 504 is coupled to a plurality of set-top boxes 508 which are each coupled to a screen 512. For the purposes of illustration, FIG. 5 shows a system with three set top boxes 508 and three screens 512. The number of set top boxes 508 and screens 512 are for illustration purposes only and it will be apparent to one of skill in the art that any number of set top boxes 508 and screens 512 are possible. Although illustrated as separate units, it is noted that in alternate embodiments, the functions of the set top boxes 508 may be integrated with the screens 512. In one embodiment, each set top box 508 and screen 512 may be in different physical locations, e.g. rooms of a home or units of a hotel, apartment building, or office suites.

The OSD system 504 comprises a system for layering multiple graphics planes onto compressed video. In one embodiment, the OSD system 504 comprises the graphics overlay architecture previously described. In one embodiment, the OSD system 504 is integrated into a digital video recorder (DVR), television, PC, or other device capable of processing video and/or graphics signals. The OSD system 504 receives commands 520 from the set top boxes 508. In one embodiment, the set top boxes 508 are remote set top boxes located at a distance from the OSD system and communicate with the OSD system through a network, for example. The commands 520 instruct the OSD system 504 to perform a video processing function that includes overlaying graphics on top of a video signal. In one embodiment, upon receiving the command 520, the OSD system 504 processes the video to layer graphics including one or more of text, still images, or animations for setup menus, alerts, program information, watermarks, or other useful displays. The command 520 also may include information identifying which set top box 508 is the source of the command 520. For example, a command 520 may instruct the OSD system 504 to layer a setup menu graphics plane on top of the video signal and send the video signal to a first screen 512a. The compressed video 516 is then outputted in compressed format to the screen 512a with graphics overlay. Thus, the system is adapted to overlay graphics on a video stream and output to a screen 512 in compressed format. In one embodiment, performing a video processing function further comprises scaling the compressed video stream 516 to match the resolution of the target screen 512.

The set top boxes 508 are coupled to the screen 512 and the OSD system 504. In one embodiment the set top boxes 508 are coupled by a network to the OSD system 504 and are located remotely from the OSD system 504. A set top box 508 can receive an action 524 from a user and relays commands 520 to the OSD system 504. An action may include, for example, pressing a button on the set top box 508, a screen 512, or a remote control coupled to the set top box 508 or screen 512. For example, consider a situation in which a user seeks to view information on a video stream that the user is currently watching on a first screen 512a. The user initiates a user action 524 by pressing an information button on a remote control communicatively coupled to the set top box 508a. The set top box 508a sends a command 520 to the OSD system 504 requesting an information graphics overlay. The OSD system 504 receives the command 520 and performs the processes to overlay program information on the video stream. The OSD system 504 then sends the compressed video 516 with program information overlayed to the first screen 512a.

A screen 512 displays the compressed video signal 516. Each screen 512 may be of the same resolution or of different resolutions. The screens 512 may each display the same video stream or different video streams with graphics overlay. Further, the OSD system 504 may receive and process different commands 520 concurrently from different set top boxes 508. Thus, each set top box 508 and screen 512 operate concurrently and independently of the other set top boxes 508 and screens 512 but are all coupled to a single OSD system 504.

The system includes a number of advantages because set top boxes 508 do not each require graphics processing engines. By performing the graphics processing (including graphics overlay) in the OSD system 504, the cost of set top boxes 508 may be greatly reduced. Thus a user can have multiple set top boxes 508 (for example, in different rooms of a house) operating from a single OSD system 504. Further, by sending video to set top boxes in a compressed format, bandwidth requirements are greatly reduced. This increases speed and performance.

Figure 6:
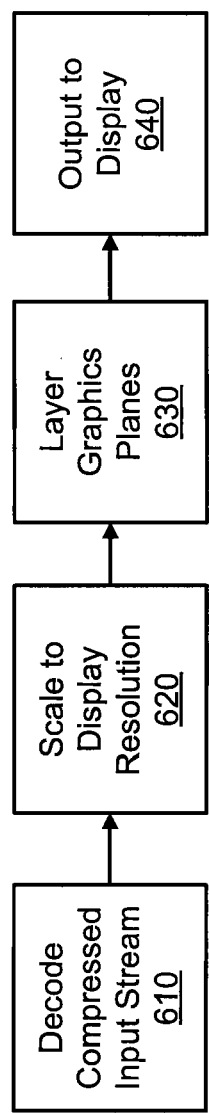
FIG. 6 is a flowchart illustrating one embodiment of a method for providing compressed video with graphics overlay to a display.

FIG. 6 is a flowchart illustrating a method for providing compressed video with graphics overlay to a display or multiple displays. In step 610, a compressed input stream is decoded. The compressed input stream may be from any compressed source. For example, the compressed input stream may be a video stream previously encoded to a compressed format and stored to a storage medium. The decoded stream is scaled 620 to a display resolution of the target display. Scaling 620 may include increasing or decreasing the resolution. Graphics are layered 630 onto the scaled video signal. In one embodiment, layering graphics includes overlaying multiple graphics planes onto the scaled video signal. In step 640, the scaled video signal with graphics overlay is outputted to a display.

Figure 7:
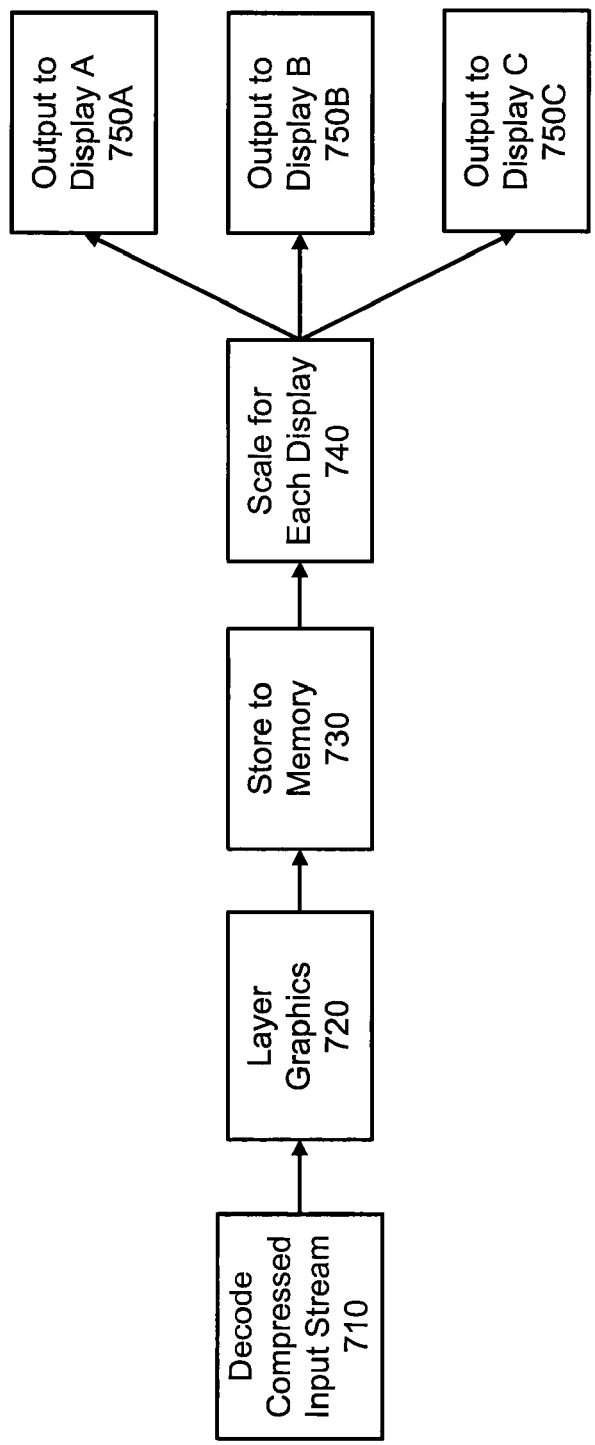
FIG. 7 is a flowchart illustrating one embodiment of a method for providing compressed video with graphics overlay to multiple displays with different resolutions.

FIG. 7 illustrates an alternative embodiment of a method for providing compressed video with graphics overlay to a multiple displays with different resolutions. In step 710, a compressed input stream is decoded. The compressed input stream may be from any compressed source. For example, the compressed input stream may be a video stream previously encoded to a compressed format and stored to a storage medium. Graphics are layered 720 onto the decoded video signal. In one embodiment, layering 720 graphics includes layering multiple graphics planes onto the decoded video signal. The decoded video stream is stored 730 to a memory in a compressed format. The decoded stream is scaled 740 for the display resolutions of each target display. Scaling 720 may include increasing or decreasing the resolution. In steps 750A-C the scaled signal is outputted to each display. By layering graphics planes prior to scaling, this embodiment is well adapted to output video with graphics overlay to multiple displays having different resolutions.

The order in which the steps of the disclosed methods are performed is purely illustrative in nature. The steps can be performed in any order or in parallel, unless otherwise indicated by the present disclosure. The methods may be performed in hardware, firmware, software, or any combination thereof operating on a single computer or multiple computers of any type. Software embodying the disclosure may comprise computer instructions in any form (e.g., source code, object code, interpreted code, etc.) stored in any computer-readable storage medium (e.g., a ROM, a RAM, a flash memory, a magnetic media, a compact disc, a DVD, etc.). Such software may also be in the form of an electrical data signal embodied in a carrier wave propagating on a conductive medium or in the form of light pulses that propagate through an optical fiber.

While particular embodiments have been shown and described, it will be apparent to those skilled in the art that changes and modifications may be made without departing from the principles herein in its broader aspect and, therefore, the appended claims are to encompass within their scope all such changes and modifications, as fall within the true spirit of this disclosure.

Reference in the specification to "one embodiment" or "an embodiment" means that a particular feature, structure, or characteristic described in connection with the embodiment is included in at least one embodiment of the system or method disclosed herein. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure herein also relates to an apparatus for performing the operations herein. This apparatus can be specially constructed for the required purposes (e.g., an application specific integrated circuit (ASIC)), or it can comprise a general-purpose computer selectively activated or reconfigured by a computer program stored in the computer. Such a computer program (e.g., comprised of instructions corresponding to the processes described above and executable by a processor) can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the embodiments disclosed are not described with reference to any particular programming language. It will be appreciated that a variety of programming languages can be used to implement the teachings of the embodiments as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, it can be implemented as a standalone program, as part of a larger program, as a plurality of separate programs, as a statically or dynamically linked library, as a kernel loadable module, as a device driver, and/or in every and any other way known now or in the future to those of skill in the art of computer programming.

What is claimed is:

1. A method for layering multiple graphics planes on top of a compressed video signal, the method comprising steps of:
   processing a video stream, encoded in a first compressed format, in a video processing path to generate a processed video stream, wherein the processed video stream comprises a stream of decoded video macroblocks belonging to a video frame;
   compositing one or more graphics layers in a graphics processing path to generate a composite graphics plane, wherein the composite graphics plane comprises a stream of composited graphics macroblocks belonging to a graphics frame, and wherein the graphics processing path composites the graphics layers one macroblock at a time;
   prior to decoding all video macroblocks in the video frame, blending, according to a macroblock order, a decoded video macroblock from the stream of decoded video macroblocks with a composited graphics macroblock from the stream of composited graphics macroblocks to generate a blended macroblock;
   generating an output video stream encoded in a second compressed format comprising the blended macroblock in macroblock order, the second compressed format different than the first compressed format, wherein at least one of the first compressed format and the second compressed format comprises an H.264 format; and
   outputting, in the macroblock order, the output video stream in the second compressed format prior to blending all of the decoded video macroblocks in the video frame with all of the composited graphics macroblocks in the graphics frame.

2. The method of claim 1, wherein the composite graphics plane is layered on top of the processed video stream in real-time or faster than real-time such that the one or more graphics planes are layered with the video stream at least as fast as a frame rate of the video stream.

3. The method of claim 1, further comprising steps of:
   decoding a compressed input video stream to generate a decoded input video stream, the compressed input video stream having a first compressed format, a first resolution and a first color space format;
   scaling the decoded input video stream to generate a scaled input video stream having a second resolution, wherein the second resolution is different than the first resolution; and
   color space converting the scaled input video stream to generate the processed video stream including the decoded video macroblock, the processed video stream having a second color space format, wherein the second color space format is different than the first color space format.

4. The method of claim 3, wherein the first color space format is an RGB format and the second color space format is a YUV format.

5. The method of claim 3, wherein the first color space format is a YUV format and the second color space format is a RGB format.

6. The method of claim 3, wherein the first color space format is a YUV 4:2:0 format and the second color space format is a YUV 4:4:4 format.

7. The method of claim 3, wherein color space converting comprises adjusting at least one of hue, contrast, saturation, brightness, gamma, and pedestal.

8. The method of claim 1, wherein the first compressed format comprises an MPEG format and the second compressed format comprises the H.264 format.

9. The method of claim 1, further comprising steps of:
receiving at least one input graphics plane having a third resolution;
scaling the at least one input graphics plane to generate at least one scaled graphics plane having a fourth resolution, wherein the fourth resolution is different than the third resolution;
flicker filtering the at least one scaled graphics planes to generate at least one filtered graphics planes; and
blending and accumulating the at least one filtered graphics planes to generate the composite graphics plane.

10. The method of claim 9, wherein the at least one input graphics plane comprises at least one of text, still images, or animations.

11. The method of claim 9, wherein the at least one input graphics plane comprises at least one of a setup menu, alert, program information, or watermark.

12. A system for layering multiple graphics planes on top of a compressed video signal comprising:
a video processing path configured to process a video stream, encoded in a first compressed format, to generate a processed video stream, wherein the processed video stream comprises a stream of decoded video macroblocks belonging to a video frame;
a graphics processing path configured to composite one or more graphics layers to generate a composite graphics plane, wherein the composite graphics plane comprises a stream of composited graphics macroblocks belonging to a graphics frame, and wherein the graphics processing path composites the graphics layers one macroblock at a time;
a blender coupled to the video processing path and the graphics processing path, the blender configured to blend, according to a macroblock order, a decoded video macroblock from the stream of decoded video macroblocks with a composited graphics macroblock from the stream of composited graphics macroblocks to generate a blended macroblock; and
a display path configured to output, in the macroblock order, an output video stream, the output stream comprising the blended macroblock in macroblock order encoded in a second compressed format different than the first compressed format, wherein at least one of the first compressed format and the second compressed format comprises an H.264 format, prior to blending all of the decoded video macroblocks in the video frame with all of the composited graphics macroblocks in the graphics frame.

13. The system of claim 12, wherein the blender layers the composite graphics plane on top of the processed video stream in real-time or faster than real-time time such that the one or more graphics planes are layered with the video stream at least as fast as a frame rate of the video stream.

14. The system of claim 12, wherein the video processing path comprises:
a decoder configured to decode a compressed input video stream to generate a decoded input video stream, the compressed input video stream having a first compressed format, a first resolution and a first color space format;
a video scaler coupled to the decoder, the video scaler configured to scale the decoded input video stream to generate a scaled input video stream having a second resolution, wherein the second resolution is different than the first resolution; and
a color space converter coupled to the video scaler, the color space converter configured to color space convert the scaled input video stream to generate the processed video stream including the decoded video macroblock, the processed video stream having a second color space format, wherein the second color space format is different than the first color space format.

15. The system of claim 14, wherein the color space converter is further configured to adjust at least one of hue, contrast, saturation, brightness, gamma, and pedestal.

16. The system of claim 12, wherein the first compressed format comprises an MPEG format and the second compressed format comprises the H.264 format.

17. The system of claim 12, wherein the graphics processing path comprises:
a graphics engine configured to generate at least one input graphics plane having a third resolution;
a graphics scaler coupled to the graphics engine, the graphics scaler configured to scale the at least one input graphics plane to generate at least one scaled graphics plane having a fourth resolution, wherein the fourth resolution is different than the third resolution;
a flicker filter coupled to the graphics scaler, the flicker filter configured to flicker filter the at least one scaled graphics planes to generate at least one filtered graphics planes; and
a graphics accumulator coupled to the flicker filter, the graphics accumulator configured to blend and accumulate the at least one filtered graphics planes to generate the composite graphics plane.

18. The system of claim 17, wherein the at least one input graphics plane comprises at least one of text, still images, or animations.

19. A non-transitory computer readable storage medium structured to store instructions executable by a processing system, the instructions when executed cause the processing system to:
processing a video stream, encoded in a first compressed format, in a video processing path to generate a processed video stream, wherein the processed video stream comprises a stream of decoded video macroblocks belonging to a video frame;
compositing one or more graphics layers in a graphics processing path to generate a composite graphics plane, wherein the composite graphics plane comprises a stream of composited graphics macroblocks belonging to a graphics frame, and wherein the graphics processing path composites the graphics layers one macroblock at a time;

prior to decoding all video macroblocks in the video frame, blend, according to a macroblock order, a decoded video macroblock from the stream of decoded video macroblocks with a composited graphics macroblock from the stream of composited graphics macroblocks to generate a blended macroblock; and generating an output video stream encoded in a second compressed format comprising the blended macroblock in macroblock order, the second compressed format different than the first compressed format, wherein at least one of the first compressed format and the second compressed format comprises an H.264 format; and outputting, in the macroblock order, the output video stream in the second compressed format prior to blending all of the decoded video macroblocks in the video frame with all of the composited graphics macroblocks in the graphics frame.

20. The computer readable storage medium of claim 19, wherein the composite graphics plane is layered on top of the processed video stream in real-time or faster than real-time time such that the one or more graphics planes are layered with the video stream at least as fast as a frame rate of the video stream.

21. The computer readable storage medium of claim 19, the instructions when executed further causing the processing system to:

decode a compressed input video stream to generate a decoded input video stream, the compressed input video stream having a first compressed format, a first resolution and a first color space format;

scale the decoded input video stream to generate a scaled input video stream having a second resolution, wherein the second resolution is different than the first resolution; and color space convert the scaled input video stream to generate the processed video stream including the decoded video macroblock, the processing video stream having a second color space format, wherein the second color space format is different than the first color space format.

22. The computer readable storage medium of claim 19, wherein the first compressed format comprises an MPEG format and the second compressed format comprises the H.264 format.

23. The computer readable storage medium of claim 21, wherein color space converting comprises adjusting at least one of hue, contrast, saturation, brightness, gamma, and pedestal.

24. The computer readable storage medium of claim 19, the instructions when executed further causing the processing system to:

receive at least one input graphics plane having a third resolution;

scale the at least one input graphics plane to generate at least one scaled graphics plane having a fourth resolution, wherein the fourth resolution is different than the third resolution;

flicker filter the at least one scaled graphics planes to generate at least one filtered graphics planes; and blend and accumulating the at least one filtered graphics planes to generate the composite graphics plane.

25. The computer readable storage medium of claim 24, wherein the at least one input graphics plane comprises at least one of text, still images, or animations.

* * * * *